Patented Oct. 16, 1928.

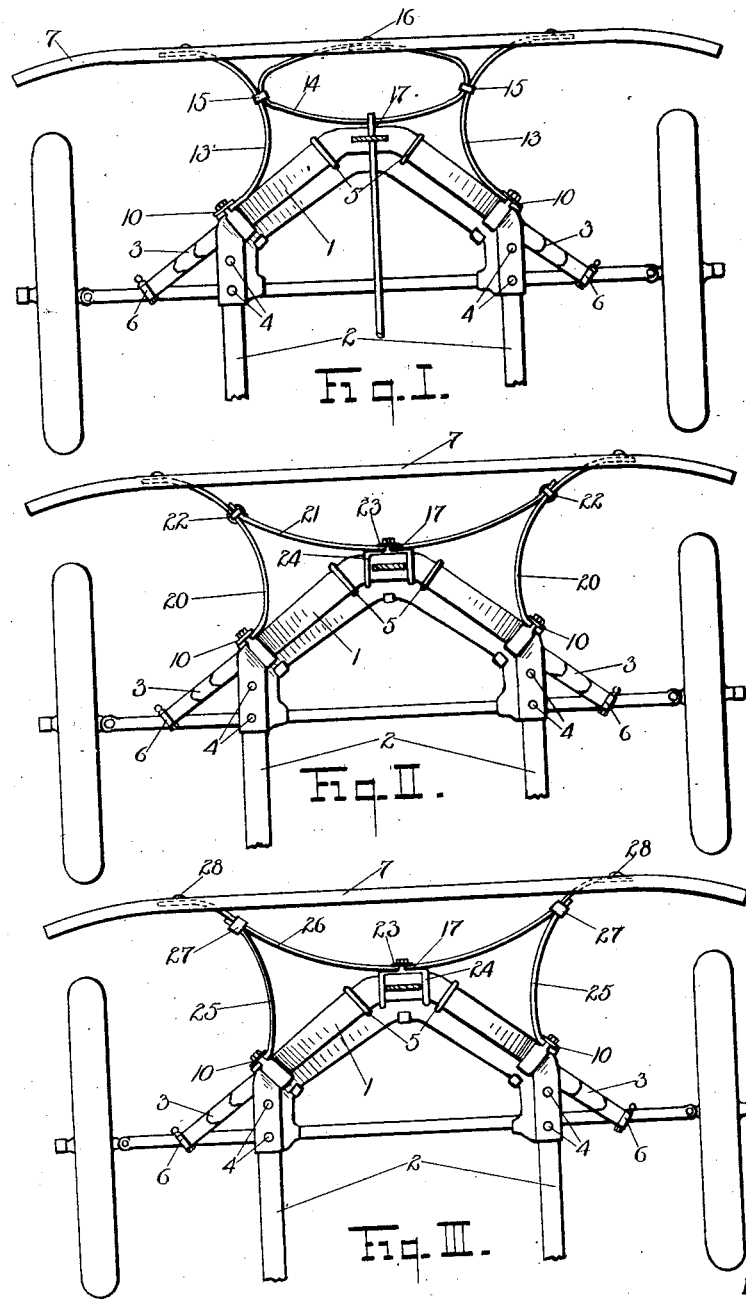

1,687,880

UNITED STATES PATENT OFFICE.

DON D. MYERS, OF TOLEDO, OHIO.

AUTOMOBILE BUMPER.

Application filed September 13, 1920. Serial No. 409,968.

This invention relates to bumpers for motor vehicles and particularly to motor vehicles which have a frame with a protruding end, such for instance, as the Overland "Model 4", though this invention may be applied to any motor vehicle.

The general object of this invention is to provide a bumper which is supported upon the vehicle in a novel manner which results in various advantages as later herein described.

Another object is to provide a bumper which has small resistance for a small deflection but has greatly increased resistance for a relatively large deflection.

Another object is to provide a bumper whose resistance to deflection increases with the amount of deflection at a rate greater than a straight line variable.

Another object is to provide a bumper which when impact occurs near one end will set itself at an angle to tend to deflect the vehicle to one side to avoid the obstruction.

Another object is to provide a bumper for vehicles having protruding ends which will accomplish the above mentioned objects.

Another object is to provide a bumper for such vehicles which will accomplish the above objects, which will not interfere with the proper operation of the cranking means for the motor on the vehicle.

Other objects such as those relating to advantages and economies of manufacture will appear as I proceed with a detailed description of the particular embodiments of my invention which for the purposes of illustration I have shown in the accompanying drawings, in which—

Figure I is a plan view of one form of my improved bumper.

Figure II is a plan view showing another embodiment of my invention.

Figure III is a plan view showing still another form of my invention.

Similar reference characters refer to similar parts throughout the several views.

1 represents a protruding end of a frame of a vehicle chassis. This protruding end piece 1 is shown as rigidly secured to the two side members 2 of the chassis frame by means of rivets or bolts 4. The cantilever springs 3 are rigidly secured to the end piece 1 by means of the U-bolts 5 and are pivoted to the front axle of the vehicle at 6 as shown in Figures I and II. 7 represents the bumper proper, which is secured to the end piece 1 by means of spring steel members 13.

Positioned between springs 13 is an oval shaped spring 14, riveted to the bumper piece 7 at its center 16 and attached to the springs 13 by means of two clips 15. The oval spring 14 preferably has a small clearance at 17 when there is only a light pressure against the bumper. At such times the springs 13 take the full load. If, however, a greater pressure be applied to the bumper 7 the springs 13 will give enough to allow spring 14 to contact and bear against the end piece 1 and thus take part of the load. Moreover the springs 13 are greatly stiffened by spring 14 after spring 14 contacts at point 17 because of the support given them at clips 15. Therefore this arrangement gives light resistance to a small deflection of the bumper due to only the springs 13 acting. However, a heavy resistance is given to larger deflections due to the additional resistance of spring 14 as well as its action in stiffening the springs 13.

In the modification shown in Figure II springs 20 are similar to springs 13 of Figure I. A spring member 21 is riveted to the springs 20 at 22 and is attached at point 17 to the end piece 1 by any suitable means. It is here shown as attached by a bracket 24 about end piece 1 having a cleat 23 held on by screw threaded nuts after the manner of cleats 10. Or a threaded lug on bracket 24 may pass through a hole in spring 21 and be held on by a nut and washer.

In the modification shown in Figure III a bow spring 26 is riveted to the bumper piece 7 at 28 and is attached to end piece 1 at the point 17 in a manner similar to that in which spring 21 is attached in the modification of Figure II. The springs 25 are attached to the end piece 1 by cleats 10 as in the other modifications and are attached to the spring 26 by clips 27. This structure differs from that shown in Figure II chiefly in the clips 27 which allow more or less sliding movement of the springs.

In the several forms of my invention the cranking handle has plenty of clearance between the bumper 7 and the springs. The cranking shaft to which the cranking handle is attached may either extend above or below the spring at point 17, or may extend through a hole provided in the spring for that purpose. It is not thought necessary to illustrate in additional views the hole in the spring, as that structure can be readily understood from the drawings by those skilled in the art.

While I have described my invention in more or less detail and as being embodied in certain forms I do not wish to be limited thereto as it is obvious to those skilled in the art that the same is capable of various modifications without departing from the scope of the invention as defined by the appended claims.

I claim as my invention:

1. An automobile bumper comprising an impact member, associated flexible supporting members for supporting said impact member on the automobile, said supporting members contacting with said automobile at only three separated points, said points being laterally spaced approximately equally one from the other.

2. In a bumper for motor vehicles having a frame, in combination, a bumper bar, two end spring means secured to said frame and attached to the adjacent end of said bar, other spring means attached to said end spring means and arranged to bear against said frame near the center line of the vehicle.

3. In a bumper for motor vehicles having a frame, in combination, a bumper bar, two end spring means secured to said frame and attached to the adjacent end of said bar, oval shaped spring means attached to said end spring means and arranged to bear against said frame near the center line of the vehicle.

4. In a bumper for motor vehicles having a frame, in combination, a bumper bar, two end spring means secured to said frame and attached to the adjacent end of said bar, other spring means attached to said end spring means and arranged to bear against said frame near the center line of the vehicle, whereby clearance space is provided for a cranking handle which may be used on the motor.

5. In a bumper for motor vehicles having a frame with a protruding end, and a cranking means extending therefrom, in combination, a bumper bar, supporting means for said bar secured to said frame laterally from the center line thereof to permit proper operation of said cranking means, spring means opposing the deflection of said bar and arranged to bear against the said protruding end.

6. In a bumper for motor vehicles having a frame, with a protruding end, and a cranking means extending therefrom, in combination, a bumper bar, supporting means for said bar secured to said frame laterally from the center line thereof to permit proper operation of said cranking means, spring means opposing the deflection of said bar and arranged to bear against the said protruding end, at or near its center.

7. In a bumper for motor vehicles having a frame with a protruding end, and a cranking means extending therefrom, in combination, a bumper bar, supporting flexible means for said bar secured to said frame laterally from the center line thereof to permit proper operation of said cranking means, spring means opposing the deflection of said bar and arranged to bear against the said protruding end.

8. In a bumper for motor vehicles having a frame with a protruding end and cranking means extending therefrom, in combination, a bumper bar, supporting means for said bar secured to said frame laterally from the center line thereof to permit proper operation of said cranking means, spring means opposing the deflection of said bar and arranged to lie in close proximity to said protruding end.

9. In a bumper for motor vehicles having a frame with a protruding end and cranking means extending therefrom, in combination, a bumper bar, supporting means for said bar secured to said frame laterally from the center line thereof to permit proper operation of said cranking means, spring means opposing the deflection of said bar and arranged to lie in close proximity to said protruding end, to avoid interference with said crankings means.

10. In a bumper for motor vehicles having a frame with a protruding end and cranking means extending therefrom, in combination, a bumper bar, supporting means for said bar secured to said frame laterally from the center line thereof to permit proper operation of said cranking means, spring means opposing the deflection of said bar and arranged to lie in close proximity to said protruding end, at or near its point of furthest protrusion.

11. In a bumper for motor vehicles having a frame with a protruding end and cranking means extending therefrom, in combination, a bumper bar, spring means for said bar secured to said frame laterally from the center line thereof to permit proper operation of said cranking means, a spring means opposing the deflection of said bar and arranged to lie in close proximity to said protruding end.

12. An automobile bumper comprising an impact member, interconnected supporting members forming a unit for supporting said impact member on the automobile, said unit contacting with said automobile at only three points.

13. An automobile bumper comprising an impact member, interconnected supporting members forming a unit for supporting said impact member on the automobile, said unit contacting with said automobile substantially at its center line and at two points spaced laterally therefrom.

14. In a bumper for motor vehicles having a frame, in combination a bumper bar; spring means adjacent opposite ends of said bar and connected to spaced points on said frame; and additional spring means attached to the end spring means first mentioned, adapted to bear against the frame near the center line of the vehicle.

15. An automobile bumper comprising an impact member; an interconnected member forming a unit for absorbing shock on said impact member, said unit being adapted to contact with said automobile substantially at its center line.

In testimony whereof, I affix my signature.

DON D. MYERS.